United States Patent
Sawada et al.

(10) Patent No.: US 10,683,117 B2
(45) Date of Patent: Jun. 16, 2020

(54) CONTAINER SEALING APPARATUS AND SEALING SYSTEM

(71) Applicant: TOYO SEIKAN CO., LTD., Tokyo (JP)

(72) Inventors: Makoto Sawada, Yokohama (JP);
Kiyotaka Shinozaki, Yokohama (JP);
Yoshiaki Shinagawa, Yokohama (JP);
Satoshi Uehara, Yokohama (JP)

(73) Assignee: TOYO SEIKAN CO., LTD., Tokyo (JP)

( * ) Notice: Subject to any disclaimer, the term of this patent is extended or adjusted under 35 U.S.C. 154(b) by 678 days.

(21) Appl. No.: 15/035,497

(22) PCT Filed: Nov. 20, 2014

(86) PCT No.: PCT/JP2014/080788
§ 371 (c)(1),
(2) Date: May 10, 2016

(87) PCT Pub. No.: WO2015/083555
PCT Pub. Date: Jun. 11, 2015

(65) Prior Publication Data
US 2016/0288939 A1    Oct. 6, 2016

(30) Foreign Application Priority Data

Dec. 6, 2013 (JP) ................................ 2013-252749
Dec. 20, 2013 (JP) ................................ 2013-263584

(51) Int. Cl.
*B65B 51/22* (2006.01)
*B29C 65/00* (2006.01)
(Continued)

(52) U.S. Cl.
CPC .......... *B65B 51/22* (2013.01); *B29C 65/1654* (2013.01); *B29C 65/1674* (2013.01);
(Continued)

(58) Field of Classification Search
None
See application file for complete search history.

(56) References Cited

U.S. PATENT DOCUMENTS 4,075,820 A * 2/1978 Standley ............. B29C 65/0672
156/580.1
4,642,971 A * 2/1987 Gilkey ..................... B26F 3/004
141/89
(Continued)

FOREIGN PATENT DOCUMENTS

CN        1926025 A      3/2007
CN      102131714 A      7/2011
(Continued)

OTHER PUBLICATIONS

English Translation of communication dated Jan. 25, 2017, issued from the State Intellectual Property Office of People's Republic of China in corresponding Application No. 201480066684.3.
(Continued)

*Primary Examiner* — Hemant Desai
*Assistant Examiner* — Tanzim Imam
(74) *Attorney, Agent, or Firm* — Sughrue Mion, PLLC

(57) ABSTRACT

A container sealing apparatus including: a rotating spindle (24); a rotating turret means (38) disposed around the rotating spindle and having pockets (40) along a circular transport path; container support means (42) arranged below the rotating turret means in correspondence with the pockets (40), and which can rotate about the rotating spindle and rotate on their axes; lid pressing means (44) arranged above the rotating turret means in correspondence with the container support means, which can rotate about the rotating spindle and rotate on their axes, and can ascend and descend relative to the container support means; and laser irradiation means (46) capable of rotating about the rotating spindle and adapted to direct laser light toward the container (2), against (Continued)

which the lid (14) has been pressed by the container support means and the lid pressing means, thereby heat welding the lid (14) to the container.

12 Claims, 6 Drawing Sheets

(51) Int. Cl.
*B29C 65/16* (2006.01)
*B29C 65/78* (2006.01)
*B65B 55/24* (2006.01)
*B65B 43/50* (2006.01)
*B65B 7/28* (2006.01)
*B29L 31/00* (2006.01)

(52) U.S. Cl.
CPC ...... *B29C 65/7841* (2013.01); *B29C 65/7885* (2013.01); *B29C 66/0222* (2013.01); *B29C 66/1312* (2013.01); *B29C 66/24221* (2013.01); *B29C 66/542* (2013.01); *B29C 66/545* (2013.01); *B29C 66/65* (2013.01); *B29C 66/73921* (2013.01); *B29C 66/8161* (2013.01); *B29C 66/8167* (2013.01); *B29C 66/82263* (2013.01); *B29C 66/8322* (2013.01); *B65B 7/2878* (2013.01); *B65B 43/50* (2013.01); *B65B 55/24* (2013.01); *B29L 2031/712* (2013.01)

(56) References Cited

U.S. PATENT DOCUMENTS

| | | | |
|---|---|---|---|
| 4,783,233 A * | 11/1988 | Yasumuro | B21D 51/26 156/227 |
| 7,575,495 B2 * | 8/2009 | Yamazaki | B29C 65/1635 445/27 |
| 2003/0021920 A1 * | 1/2003 | Williamson | B23K 26/28 428/34.1 |
| 2006/0191840 A1 * | 8/2006 | Homi | B01D 27/005 210/435 |
| 2007/0056679 A1 * | 3/2007 | Orlandi | B29C 53/44 156/217 |
| 2007/0084839 A1 | 4/2007 | Zhang et al. | |
| 2007/0131639 A1 | 6/2007 | Nakaya et al. | |
| 2008/0318052 A1 * | 12/2008 | Brown | B29C 45/006 428/411.1 |
| 2009/0120556 A1 * | 5/2009 | Nakaya | B21D 51/2661 156/69 |
| 2010/0096388 A1 * | 4/2010 | Kobayashi | B29C 66/12841 220/359.4 |
| 2010/0301522 A1 * | 12/2010 | Hokoda | B29C 65/1635 264/482 |
| 2011/0036817 A1 * | 2/2011 | Ehrmann | B29C 65/1619 219/121.64 |
| 2011/0117302 A1 | 5/2011 | Shinozaki et al. | |
| 2012/0086142 A1 * | 4/2012 | Terada | B29C 33/58 264/39 |
| 2012/0226229 A1 * | 9/2012 | Watanabe | A61M 25/1034 604/103 |
| 2013/0036708 A1 | 2/2013 | Masuda et al. | |
| 2015/0083302 A1 | 3/2015 | Sawada et al. | |

FOREIGN PATENT DOCUMENTS

| | | | | |
|---|---|---|---|---|
| CN | 102803075 A | 11/2012 | | |
| EP | 0 483 569 A1 | 5/1992 | | |
| EP | 2287077 A1 | 2/2011 | | |
| JP | 49-49599 B1 | 12/1974 | | |
| JP | 54-74665 U | 5/1979 | | |
| JP | 2002-068139 A | 3/2002 | | |
| JP | 2002-273367 A | 9/2002 | | |
| JP | 2005-212589 A | 8/2005 | | |
| JP | 2007-111773 A | 5/2007 | | |
| JP | 2007-261665 A | 10/2007 | | |
| JP | 2007-261666 A | 10/2007 | | |
| JP | 2011-51627 A | 3/2011 | | |
| JP | 4855120 B2 * | 1/2012 | ......... | B29C 65/1654 |
| JP | 2013-1432 A | 1/2013 | | |
| WO | 2013/146190 A1 | 10/2013 | | |

OTHER PUBLICATIONS

International Search Report for PCT/JP2014/080788 dated Feb. 24, 2015.

* cited by examiner

CONTAINER SEALING APPARATUS AND SEALING SYSTEM

CROSS REFERENCE TO RELATED APPLICATIONS

This application is a National Stage of International Application No. PCT/JP2014/080788 filed Nov. 20, 2014, claiming priority based on Japanese Patent Application Nos. 2013-252749 filed Dec. 6, 2013 and 2013-263584 filed Dec. 20, 2013, the contents of all of which are incorporated herein by reference in their entirety.

TECHNICAL FIELD

This invention relates to a container sealing apparatus, more specifically to a container sealing apparatus for heat welding a lid to a container by laser irradiation; and to a container sealing system including such a container sealing apparatus, and a container flange section cleaning device for cleaning a flange section of the container prior to sealing of the container.

BACKGROUND ART

As containers for contents such as various foods or pet foods, cup-shaped or tray-shaped containers each comprising suitable resin and having a shape including a bottom wall, a side wall extending upward from the bottom wall, and a flange section extending radially outwardly from the upper end of the side wall are in wide practical use. In using such a container, it is common practice to fill contents into the container, then place a flange of a molded lid comprising a plastic synthetic resin on the flange section of the container, and then secure the flange of the lid to the flange section of the container for sealing. In connection with the sealing of such a type of container, Patent Document 1 to be described below discloses a device for producing a sealed container, which comprises a container transport means for transporting a container, and a rotary disk body rotating at the same speed as the transport speed of the container transport means, and includes a lid fixing means for pressing a lid mounted on the trunk of the container, wherein a plurality of the lid fixing means are arranged with equal spacing at the peripheral edge of the rotary disk body, and locations of the trunk of the container and the lid to be scheduled for welding are irradiated with laser light.

Patent Document 2 to be described below, on the other hand, discloses a sealing method by laser welding of a container and a lid, wherein one of the container and the lid comprises a thermoplastic resin permeable to laser light, while the other of them comprises a resin composition composed of a thermoplastic resin containing an exothermic substance which absorbs laser light to generate heat, a laser for the laser light is a laser capable of throwing a rectangular beam uniform in intensity distribution, and the range of the upper limit of a temperature to be raised by laser irradiation, and the conditions for reaching the upper limit temperature are defined for the welding interface between the lid and the container.

PRIOR ART DOCUMENTS

Patent Documents

Patent Document 1: JP-A-2007-261666
Patent Document 2: WO2013/146190

SUMMARY OF THE INVENTION

Problems to be Solved by the Invention

In the device for producing a sealed container according to Patent Document 1, however, a pressing section of a presser plate of the above-mentioned lid fixing means disposed on an optical path for laser light is formed from a material permeable to laser light, such as glass or acrylic resin. Thus, its durability against a load on the lid mounted on the container trunk is low. If dust or dirt adheres to it, moreover, a decline in the permeability to laser light occurs. Furthermore, if laser light is thrown from an oblique direction, refraction of the laser light occurs. In any such case, there is a possibility that heat welding by laser irradiation cannot be performed efficiently.

Besides, with the device for producing a sealed container according to Patent Document 1, a proposal has also been made for a device for producing a sealed container, the device including a lid welding means equipped with an optical branching device installed on a rotating shaft of the rotary disk body; and a plurality of laser light irradiation sections connected to the lid welding means via an optical connection means such as an optical fiber. Such a device configuration, however, complicates and upsizes the device.

On the other hand, Patent Document 2 proposes, in connection with the sealing method by laser welding of a container and a lid, a laser welding method achieving sealing reliably in a short time. This document, however, has made no proposal for such a device configuration as to increase production capacity, without complicating or upsizing a device for sealing a container by laser welding.

In addition, when contents are, filled into the container, the contents may deposit on the upper surface of the flange section of the container. Assume, here, that a molded lid is placed on the container, with the contents being deposited on the upper surface of the flange section of the container, and the lid is welded to the flange section of the container by irradiation with laser light to seal the container. In this case, the possibility arises that a sealing failure will occur owing to the contents interposed between the outer peripheral edge section of the molded lid and the flange section of the container.

The present invention has been accomplished in light of the above-described circumstances. A principal technical challenge to the present invention is to provide a novel and improved container sealing apparatus for heat welding a lid to a container by laser irradiation, which apparatus reliably presses the container and the lid against each other, efficiently performs the heat welding by laser irradiation, and can increase production capacity, without complicating or upsizing the apparatus.

Another technical challenge to the present invention is to provide a novel and improved container sealing system including the above container sealing apparatus, and a container flange section cleaning device which can remove contents depositing on a flange section of a container prior to sealing of the container by the container sealing apparatus, and can clean the upper surface of the flange section of the container with high efficiency, while reliably avoiding the intrusion of the contents or foreign matter, such as a cleaning solution, into the container when cleaning the flange section.

Means for Solving the Problems

According to the present invention, there is provided, as a container sealing apparatus for solving the above principal technical challenge, a container sealing apparatus comprising:

a rotating spindle;

rotating turret means disposed around the rotating spindle and having a plurality of pockets along a circular transport path;

a plurality of container support means which are arranged below the rotating turret means in correspondence with the plurality of pockets, and can rotate about the rotating spindle and rotate on the axes of the container support means;

a plurality of lid pressing means which are arranged above the rotating turret means in correspondence with the container support means, can rotate about the rotating spindle and rotate on the axes of the lid pressing means, and can ascend and descend relative to the container support means; and a plurality of laser irradiation means capable of rotating about the rotating spindle and adapted to throw laser light toward a container, against which a lid has been pressed by the container support means and the lid pressing means, thereby heat welding the lid to the container.

In a preferred embodiment, upper table means located above the rotating turret means and lower table means located below the rotating turret means are disposed on the spindle, the lid pressing means are arranged in the upper table means, and the laser irradiation means are arranged on the lower table means.

It is also preferred that the container support means be arranged to be movable upward and downward, and ascent/descent means be annexed for raising and lowering each of the container support means.

Further preferably, the laser light is thrown from below; each of the laser irradiation means is a direct diode laser; and the container is in a shape having a flange section, and the lid is a molded lid to be placed on the flange section of the container.

According to the present invention, there is also provided, as a container sealing system for solving the above other principal technical challenge, a container sealing system including a container flange section cleaning device for cleaning a flange section of a container, which is to be sealed by the container sealing apparatus of the present invention, prior to sealing, wherein the container flange section cleaning device comprises: support means for supporting the container; sealing means intimately contacting and separating from the inner peripheral end of the flange section, and reciprocating relative to the container; and cleaning/solution removal means, disposed above the sealing means, for bringing the sealing means into intimate contact with the inner peripheral end, jetting a cleaning solution at an upper surface of the flange section, and jetting a gas at the upper surface of the flange section after jetting the cleaning solution.

In a preferred embodiment, the cleaning/solution removal means has a jet orifice and a flow path leading to the jet orifice, and is equipped with a cleaning solution supply source for supplying the cleaning solution to the jet orifice via the flow path, and a gas supply source for supplying the gas to the jet orifice via the flow path. It is also preferred that the jet orifice be many small holes provided at suitable intervals in the circumferential direction, the outer peripheral surface of the sealing means be in an inverted truncated conical shape, and a site of the sealing means making intimate contact with the inner peripheral end of the flange section of the container be a rubbery elastic body. It is further preferred that the container flange section cleaning device be disposed along a circular transport path sequentially including a container carry-in region, a sealing region where the sealing means is brought into intimate contact with the flange section of the container, a cleaning region for the flange section, a solution removal region for the flange section, a separation region where the sealing means is separated from the flange section, and a container carry-out region, with the container flange section cleaning device being rotated about the center of the circular transport path.

Effects of the Invention

According to the container sealing apparatus of the present invention, the pressing of the container and the lid against each other is reliably carried out by the rotating turret having the plurality of pockets, the plurality of container support means, and the plurality of lid pressing means. The laser irradiation means composed of the plurality of downsized, lightweight direct diode lasers enable heat welding to be performed efficiently, without influence from each of the above means, during laser irradiation. Consequently, production capacity can be increased without complication or upsizing of the apparatus.

According to the container sealing system of the present invention, contents, which have been deposited on the upper surface of the flange section of the container during charging of the contents into the container, are removed from the upper surface of the flange section before sealing with the lid material by the aforementioned container sealing apparatus, whereby cleaning is performed reliably. Moreover, the intrusion of the contents or foreign matter, such as the cleaning solution, into the container at the time of the above removal and cleaning can be reliably avoided, and a sealing failure due to the foreign matter can be reliably prevented. Furthermore, according to the container sealing system of the present invention, the removal of the contents deposited on the upper surface of the flange section of the container, as well as cleaning, can be performed reliably and highly efficiently.

MODE FOR CARRYING OUT THE INVENTION

Figure 1:
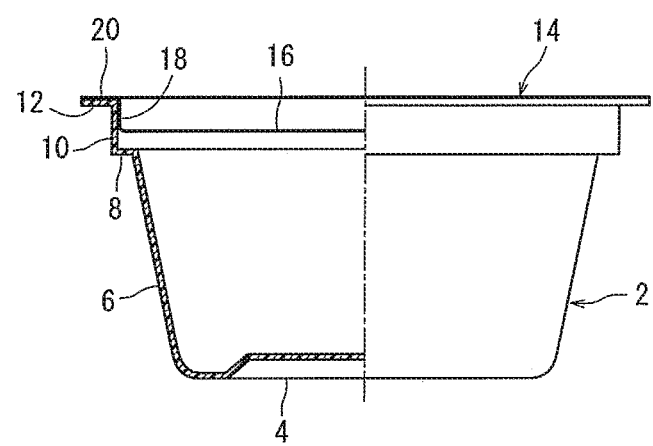
FIG. 1 is a sectional view showing, together with a lid, a typical example of a container to be sealed by a container sealing apparatus according to the present invention.

FIG. 1 shows, together with a lid, a typical example of a container to be sealed by heat welding using a container sealing apparatus according to the present invention. A container 2 molded from a suitable thermoplastic synthetic resin includes a circular bottom wall section 4, a main side wall section 6 of an inverted truncated conical shape extending upward from the outer peripheral edge of the bottom wall section 4, an overhanging wall section (stack section) 8 of a toroidal shape extending radially outwardly from the upper edge of the main side wall section 6, an additional side wall section 10 of a cylindrical shape extending upwardly from the outer peripheral edge of the overhanging wall section 8, and a flange section 12 extending substantially horizontally in a radially outward direction from the upper edge of the additional side wall section 10. A lid 14 similarly molded from a suitable thermoplastic resin includes a circular main section 16, a rising wall section 18 extending upward from the outer peripheral edge of the main section 16, and a flange 20 extending horizontally in a radially outward direction from the upper edge of the rising wall section 18. After contents are filled into the Container 2, the main section 16 and the rising section 18 of the lid 14 are fitted into the container 2, and the flange 20 of the lid 14 is brought into intimate contact with the flange section 12 of the container 2, as shown in FIG. 1. Then, the flange 20 of the lid 14 and the flange section 12 of the container 2 are heat welded to seal the container 2.

Figure 2:
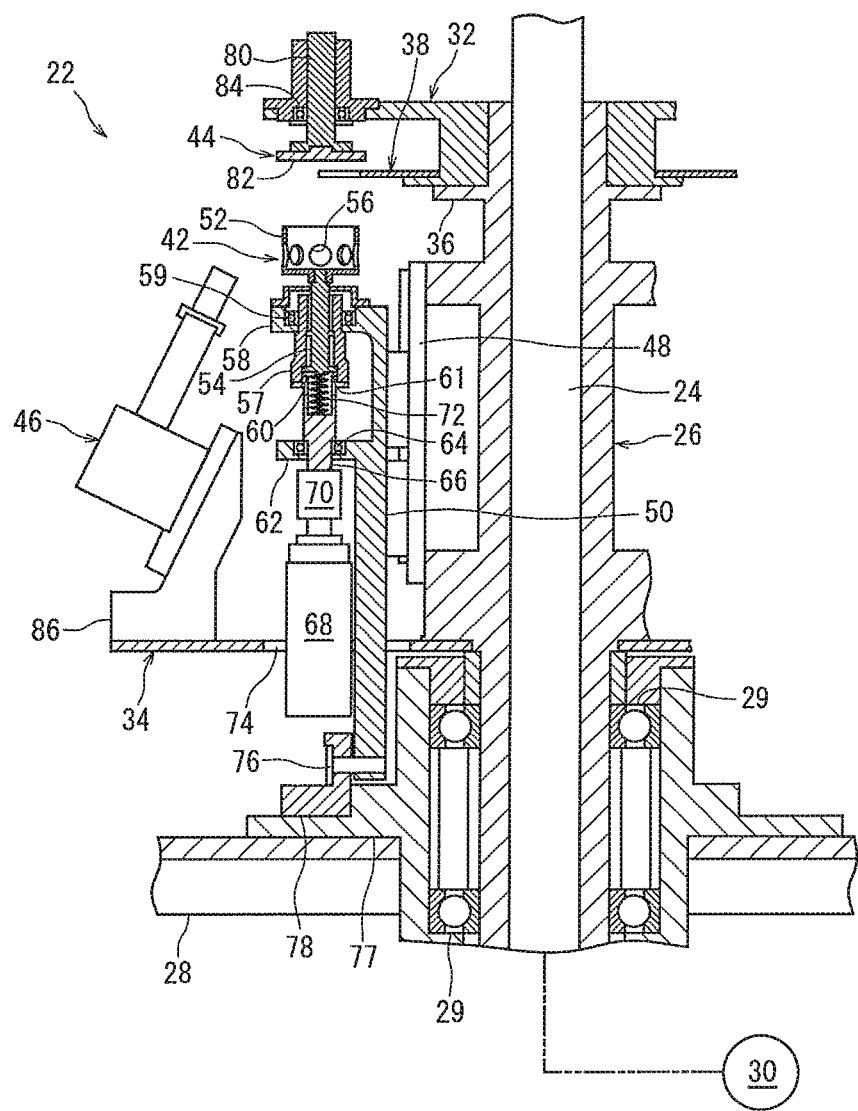
FIG. 2 is a partial sectional view showing a preferred embodiment of the container sealing apparatus according to the present invention.

FIG. 2 shows a preferred embodiment of the container sealing apparatus of the present invention. The sealing apparatus, entirely indicated at 22, is equipped with a rotating spindle 24 extending substantially vertically, and a coupling member 26 of a nearly cylindrical shape as a whole is fixed to the outer peripheral surface of the rotating spindle 24. A lower end part of the coupling member 26 is rotatably mounted via a bearing means 29 on a stationary base plate 28 supported by a suitable support structure (not shown). An upper end part of the rotating spindle 24 is also rotatably mounted via a bearing means on a stationary structure, although this is not shown. The lower end of the rotating spindle 24 extends out downwardly through the stationary base plate 28, and is drivably coupled to a rotating means 30 including an electric motor and a transmission mechanism, so that the rotating spindle 24 is rotationally driven clockwise by the rotating means 30 (see FIG. 3).

Figure 3:
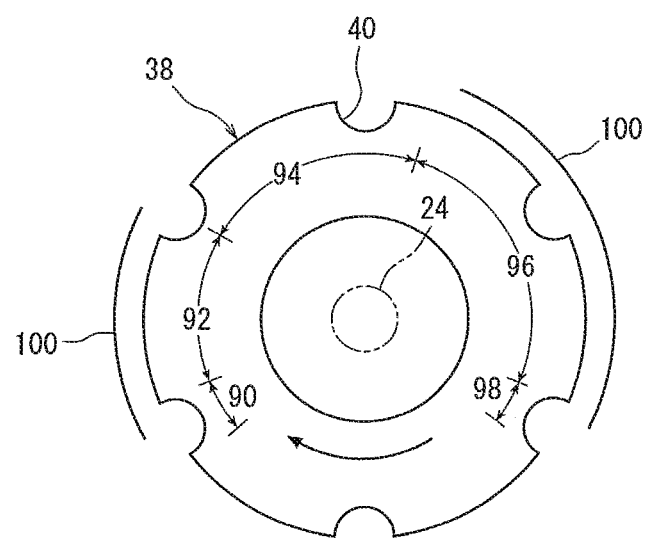
FIG. 3 is a schematic view of a rotating turret in the container sealing apparatus shown in FIG. 2.

A disk-shaped upper table means 32 is fixed to the upper end of the coupling member 26 fixed to the outer peripheral surface of the rotating spindle 24, while a disk-shaped lower table means 34 is fixed to a lower part of the coupling member 26. A mounting section 36 located below the upper table means 32 is annexed to the upper table means 32, and a disk-shaped rotating turret means 38 is fixed to the mounting section 36. As shown in FIG. 3, a plurality of (6 in the drawing) nearly semicircular notches, namely, pockets 40, are arranged on the outer periphery of the rotating turret means 38 with equal spacing in the circumferential direction.

In correspondence with each of the pockets 40 of the rotating turret means 38, a container support means 42 is disposed in the coupling member 26, a lid pressing means 44 is disposed in the upper table means 32, and laser irradiation means 46 is disposed on the lower table means 34. The respective container support means 42 and lid pressing means 44 are in alignment, and are arranged below or above the pockets 40 in alignment with the respective pockets 40.

In correspondence with each of the pockets 40, moreover, a guide rail member 48 extending vertically is fixed to the outer peripheral surface of the coupling member 26, and an ascent/descent member 50 is mounted on the guide rail member 48 so as to be movable vertically, namely, be ascendable and descendable. On the ascent/descent member 50, the above-mentioned container support means 42 is mounted, and each container support means 42 has a cup-shaped member 52 and a shaft member 54 suspending downward from the center of the lower surface of the cup-shaped member 52. In the cylindrical side wall of the cup-shaped member 52, a plurality of circular openings 56 are formed with spacing in the circumferential direction in order to render the cup-shaped member 52 lightweight and reduce the load on a rotational drive source 68 for the container support means 42. A restraint member 57 is mounted on the outside of the shaft member 54 so as to be ascendable and descendable relative to the shaft member 54. A first support flange 58 overhanging radially outwardly is formed in an upper end part of the ascent/descent member 50, and the restraint member 57 is rotatably mounted on the first support flange 58 via a bearing means 59. In an inner peripheral surface of the restraint member 57, a tapered shoulder surface 60 is formed at a lower position. On the other hand, a locking flange 61 overhanging radially outwardly is formed at the lower end of the shaft member 54. The locking flange 61 makes contact with the shoulder surface 60, thereby restricting the ascent of the shaft member 54 relative to the restraint member 57.

A second support flange 62 overhanging radially outwardly is formed in a vertically intermediate part of the ascent/descent member 50, and a connection member 66 is rotatably mounted in the second support flange 62 via a bearing means 64. The upper end of the connection member 66 is coupled to the lower end of the restraint member 57. The rotational drive source 68, such as a servo motor, is mounted on a lower end part of the ascent/descent member 50, and an output shaft protruding upwardly of the rotational drive source 68 is drivingly coupled to the lower end of the connection member 66 via a transmission means 70 such as a friction clutch. Furthermore, the connection member 66 has an upper half formed in a cylindrical shape, and a helical compression spring 72 is housed within this upper half. The upper end of the helical compression spring 72 is in contact with a lower end surface of the shaft member 54, and the shaft member 54 is elastically supported in an upward direction by the helical compression spring 72 relative to the connection member 66.

A lower end part of the ascent/descent member 50 and a lower end part of the rotational drive source 68 are extended through an opening 74, which is formed in the lower table means 34, to reach an area below the lower table means 34. A cam roller 76 constituting a cam follower is rotatably mounted on the lower end part of the ascent/descent member 50. On the other hand, a cam block 78 is fixed to the aforementioned stationary base plate 28 via a stationary coupling member 77 located outside the bearing means 29, and a cam groove extending continuously in the circumferential direction is formed in the cam block 78. The cam roller 76 mounted in the ascent/descent member 50 is engaged with the cam groove formed in the cam block 78 and, in accordance with the rotation of the rotating spindle 24, the ascent/descent member 50 and the container support means 42 mounted thereon are moved upward and downward. That is, the cam groove formed in the cam block 78 and the cam roller 76 mounted in the ascent/descent member 50 constitute an ascent/descent means for raising and lowering each container support means 42.

Furthermore, the lid pressing means 44 in the present embodiment is composed of a shaft member 80, and a disk-shaped pressing member 82 fixed to the lower end of the shaft member 80, and the surface of the pressing member 82 is a flat surface extending substantially horizontally. The shaft member 80 is rotatably mounted in the upper table means 32 via a bearing means 84.

On the lower table means 34, a support base 86 for supporting the laser irradiation means 46 is fixed in correspondence with each of the pockets 40 of the rotating turret means 42. On an inclined support surface of each of the support bases 86, the laser irradiation means 46 is mounted, preferably so as to be position adjustable along the support surface, and so as to be adjustable in angle with respect to the support face. The laser irradiation means 46 is preferably a relatively compact direct diode laser.

Next, a sealing process for the container will be described by reference to FIG. 2 to FIGS. 4A to 4C.

First, the rotating spindle 24 continuously rotates clockwise, and the rotating turret means 38, the upper table means 32, and the lower table means 34 also similarly rotate clockwise. As a result, each pocket 40 disposed in the rotating turret means 38, the container support means 42, the lid pressing means 44, and the laser irradiation means 46 rotate about the rotating spindle 24, and they are transported along a circular transport path sequentially including a carry-in region 90, a container ascent region 92, a laser irradiation region 94, a container descent region 96, and a carry-out region 98.

Figure 4A:
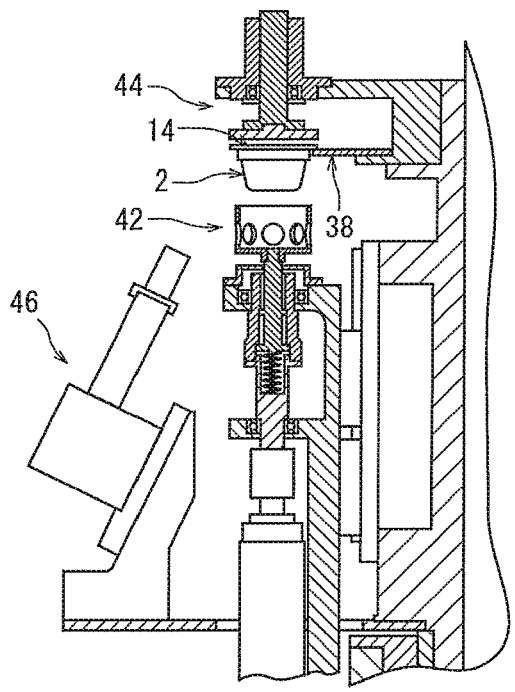
FIGS. 4A to 4C are partial sectional views for illustrating the respective steps of the container sealing apparatus shown in FIG. 2.
Figure 4B:
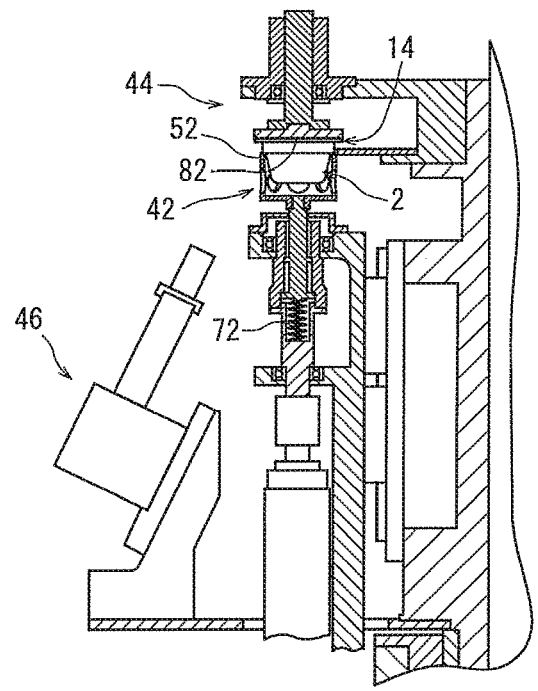

In the carry-in region 90, the container 2 capped with the lid 14 is carried into the pocket 40 by a suitable carry-in means (not shown) and, as shown in FIG. 4A, the flange section 12 of the container 2 is suspended from the rotating turret means 38. Then, in the container ascent region 92, the container support means 42 is rotated on its axis by the aforementioned rotational drive source 68, transmission means 70 and connection member 66, and is also raised by the cam roller 76 at the lower end part of the ascent/descent member 50 and the cam groove of the cam block 78 fixed via the stationary coupling member 77 of the stationary base plate 28. As a result, as shown in FIG. 4B, the main section of the container 2 is housed in the cup-shaped member 52 of the container support means 42, and the upper edge of the cup-shaped member 52 contacts the lower surface of the overhanging wall section (stack section) 8 of the container 2 (see FIG. 1). In this state, the container 2 and the lid 14 are raised while being rotated on their axes, and are separated above the rotating turret means 38. Then, the container 2 is pushed up by the cup-shaped member 52 of the container support means 42 and, with the elastic force of the helical compression spring 72 being applied, the lid 14 is pressed by the pressing member 82 of the lid pressing means 44, whereby the flange section 12 of the container 2 and the flange 20 of the lid 14 are brought into intimate contact.

Figure 4C:
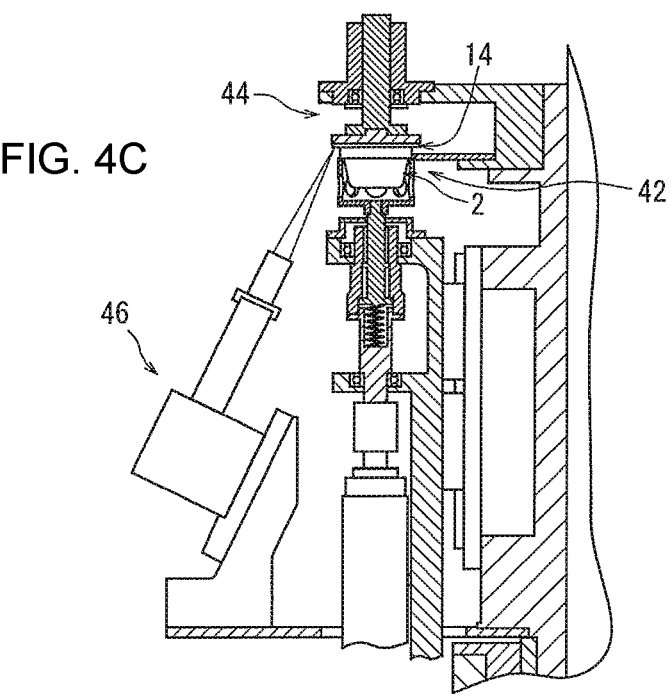

In the laser irradiation region 94, as shown in FIG. 4C, the flange section 12 of the container 2 and the flange 20 of the lid 14 are pressed against and intimately contacted with each other by the pressing means 44. Under these conditions, the flange section 12 of the container 2 rotated on its axis is irradiated with laser light by the laser irradiation means 46, whereby laser light is applied to the entire periphery of the flange section 12 of the container 2 in the circumferential direction. Upon the irradiation with laser light by the laser irradiation means 46, the flange 20 of the lid 14 is heat welded, in its entirely circumferential direction, to the flange section 12 of the container 2 to seal the container 2. During the laser irradiation, laser light is directed from below, so that heat welding can be performed even more efficiently, without undergoing the influence of each of the means mentioned above.

Finally, in the container descent region 96, the container support means 42 descends, while rotating, to the position illustrated in FIG. 4A, and the container 2 having the lid 14 heat welded thereto is suspended from the rotating turret means 38, whereas the container support means 42 is separated downward from the container 2. If desired, the rotation of the container support means 42 can be started in the container ascent region 92, and completed in the container descent region 96. In the carry-out region 98, the container 2 having the lid 14 heat welded thereto is carried out of the rotating turret means 38 by a suitable carry-out means (not shown). Further, as shown schematically in FIG. 3, arcuately extending outer stationary guides 100 are disposed in the container ascent region 92 and the container descent region 96 in order to prevent the container 2 from slipping out of the pocket 40 of the rotating turret means 38. In the illustrated embodiment, the container support means 42 is raised, and the flange 20 of the lid 14 is pressed by the lid pressing means 44. Instead, however, there can be adopted a configuration in which pressing is carried out using the container support means 42, or using both of the lid pressing means 44 and the container support means 42.

Figure 5:
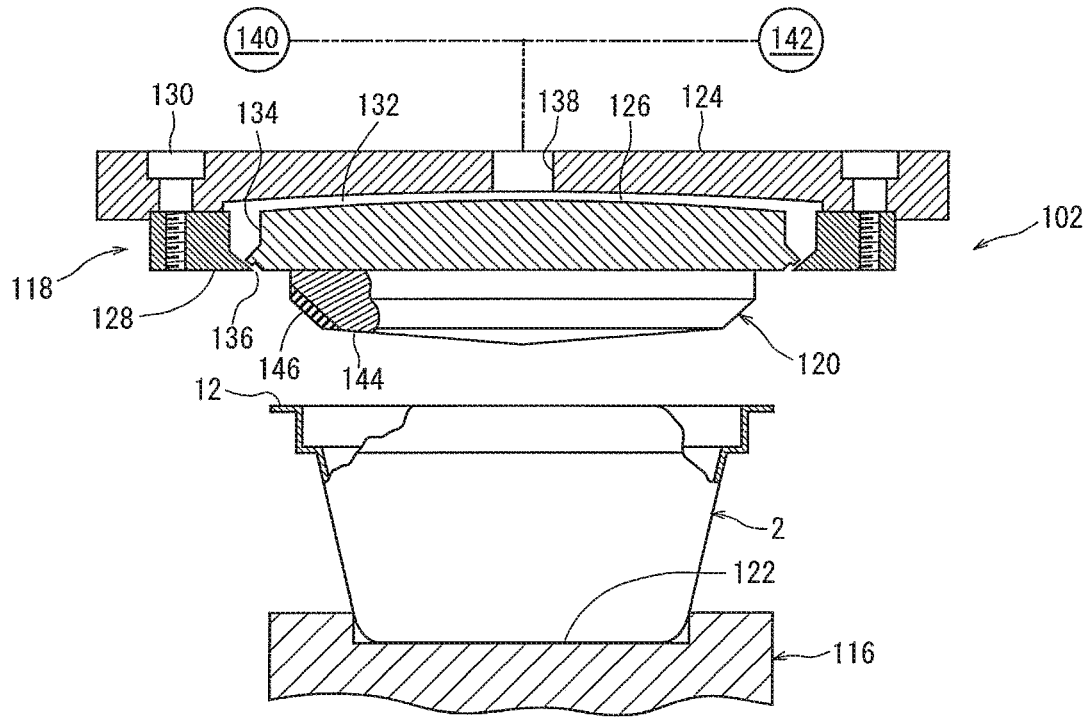
FIG. 5 is a schematic view showing, partly in section, a preferred embodiment of a container flange section cleaning device in a container sealing system according to the present invention, with a sealing means being separated from the inner peripheral end of a flange section of the container.

FIG. 5 shows, in a container sealing system according to the present invention, a preferred embodiment of a container flange section cleaning device 102, by which the flange section of the container to be sealed by the aforementioned container sealing apparatus is cleaned prior to sealing, as well as the container 2 which is a typical example of the container (see FIG. 1) whose flange section is cleaned by such a cleaning device.

The illustrated flange section cleaning device 102 for cleaning the upper surface of the flange section 12 of the container 2 is equipped with a support means 116, a cleaning/solution removal means 118, and a sealing means 120. The support means 116 for supporting the container 2 has a horizontally extending upper surface, and a circular recess 122 is formed in the center of the upper surface. The inner diameter of the circular recess 122 corresponds to the outer diameter of a lower end part of the container 2 and, as shown in FIG. 5, the lower end part of the container 2 is mounted within the circular recess 122, whereby the container 2 is supported in an upright state by the support means 116.

Figure 6:
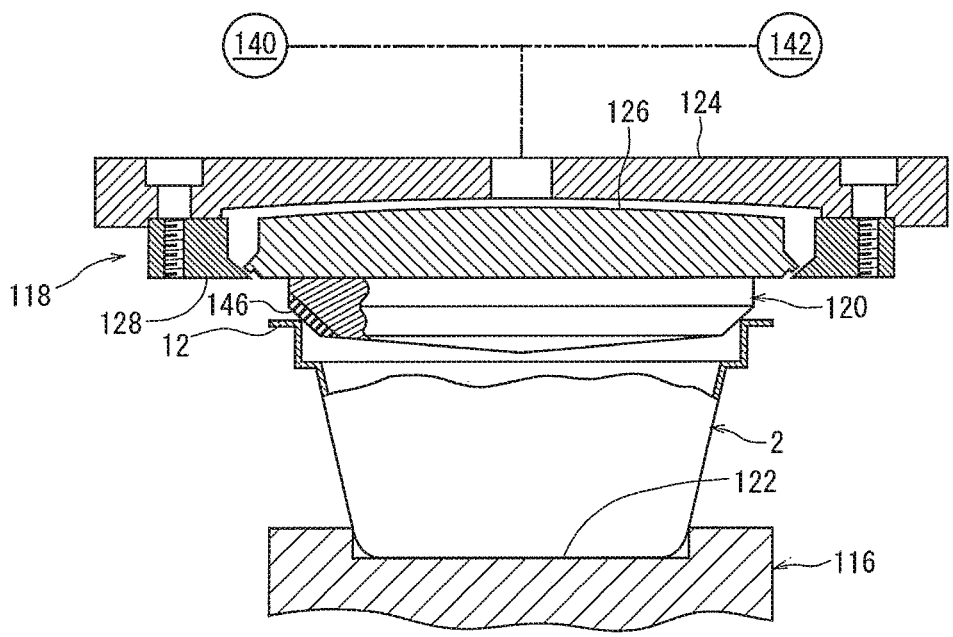
FIG. 6 is a schematic view showing, partly in section, the preferred embodiment of the flange section cleaning device in the container sealing system according to the present invention, with the sealing means being in intimate contact with the inner peripheral end of the flange section of the container.

The cleaning/solution removal means 118 includes a generally disk-shaped base plate 124, a nearly disk-shaped inner member 126, and a toroidal plate-shaped outer member 128 integrally provided via a lower end part of the inner member 126. The base plate 124 is ascendably and descendably mounted by a suitable mounting means (not shown), and is moved upward and downward, i.e., reciprocated, by a suitable raising/lowering means (not shown), such as a hydraulic cylinder mechanism, between a state in which the sealing means 120 is separated from the inner peripheral end of the flange section 12 of the container 2 as illustrated in FIG. 5 (separation position), and a state in which the sealing means 120 is brought into intimate contact with the inner peripheral end of the flange section 12 of the container 2 as illustrated in FIG. 6 (intimate contact position). The outer member 128 is fixed to a lower surface of the base plate 124 by means of fastening bolts 130, and the above-mentioned sealing means 120 is brought into a separated state and an intimately contacted state. Many flow paths 132 extending radially are formed between the base plate 124 and the inner member 126, an annular flow path 134 is formed between the outer peripheral surface of the inner member 126 and the inner peripheral surface of the outer member 128, and a jet orifice 136 composed of many small holes provided at suitable intervals in the circumferential direction is formed in lower end parts of the inner member 126 and the outer member 128. In the center of the base plate 124, a flow path 138 is formed which extends downward from the upper surface of the base plate 124 and communicates with the flow paths 132, and a cleaning solution supply source 140 and a gas supply source 142 are connected to the flow path 138. When the cleaning solution supply source 140 is actuated, a cleaning solution such as tap water is supplied to the jet orifice 136 via the flow path 138, the flow paths 132 and the annular flow path 134, and gushed from the jet orifice 136. Upon actuation of the gas supply source 142, on the other hand, a gas such as compressed air is supplied to the jet orifice 136 via the flow paths 138, 132 and 134, and ejected from the jet orifice 136.

Instead of the jet orifice 136 for jetting the tap water and gas mentioned above, it is permissible to configure the inner member 126 and the outer member 128 as separate members, and provide clearances in their lower end parts to form a toroidal jetting section continuous in the circumferential direction. From the aspect of effectively cleaning the entire upper surface of the flange section 12 of the container 2 and removing the solution after cleaning, however, it is preferred to form the jet orifice composed of many small holes provided at suitable spacings in the circumferential direction of the lower end parts of the inner member 126 and the outer member 128.

The jetting angle of the above jet orifice or jetting section with respect to the upper surface of the flange section 12 of the container 2 is preferably 30 to 60 degrees, particularly 40 to 50 degrees, in further effectively performing cleaning and solution removal after cleaning.

The sealing means 120 is fixed to the lower surface of the inner member 126 of the cleaning/solution removal means 118 by suitable fastening means (not shown) such as fastening bolts, and is raised and lowered, namely, reciprocated, between the separation position shown in FIG. 5 and the intimate contact position shown in FIG. 6 in accordance with the upward and downward movement of the base plate 124. The sealing means 120 preferably has an outer peripheral surface whose upper half assumes a cylindrical shape and whose lower half assumes an inverted truncated conical shape, and the inverted truncated conical lower half is preferably intimately contacted with the inner end of the flange section 12 of the container 2. As the outer peripheral surface of the site in the sealing means 120, which is brought into intimate contact with the inner end of the flange section 12 of the container 2, it is desirable to use a rubbery elastic body having a rubber hardness (JIS K 6253), preferably, of the order of 10 to 70. In the illustrated embodiment, the sealing means 120 is composed of a main body 144 formed from a suitable metal or synthetic resin, and an annular rubbery elastic body 146 mounted on a lower half of the outer peripheral surface of the main body 144 by a suitable means.

In the container flange section cleaning device of the present invention configured as above, the container 2 filled with contents, in an upright state, is carried into and placed on the circular recess 122 of the support means 116, as show in FIG. 5. Then, the base plate 124 is lowered from the separation position shown in FIG. 5 to the intimate contact position shown in FIG. 6 to bring the rubbery elastic body 146 of the sealing means 120 into intimate contact with the inner peripheral end of the flange section 12 of the container 2 with a required pressing force. As a result, the container 2 filled with the contents is sealed by the sealing means 120. After this sealing, the cleaning solution from the cleaning solution supply source 140 is supplied to the jet orifice 136 via the flow paths 138, 132 and the annular flow path 134, and jetted at the upper surface of the flange section 12 of the container 2 to remove the contents deposited on the upper surface of the flange section 12. Then, the supply of the cleaning solution from the cleaning solution supply source 140 is stopped. Similarly, the gas from the gas supply source 142 is supplied to the jet orifice 136 via the flow paths 138, 132 and the annular flow path 134, and jetted at the upper surface of the flange section 12 of the container 2 to remove the cleaning solution remaining on the upper surface of the flange section 12. In this manner, the upper surface of the flange section 12 of the container 2 is cleaned and cleared of the solution, with the sealing means 120 being intimately contacted with the inner peripheral end of the flange section 12 to seal the container 2. Thus, the intrusion of the cleaning solution and the contents during cleaning, and the intrusion of the jetted gas or the remaining cleaning solution during solution removal, into the container 2 can be reliably prevented. Finally, after the supply of the gas from the gas supply source 142 is stopped, the base plate 124 is raised to the position shown in FIG. 5 to separate the sealing means 120 from the inner end of the flange section 12 of the container 2. Then, the container 2 having the upper surface of the flange section 12 cleaned and removed of the solution is carried out of the support means 116.

In the above embodiment, the base plate 124, namely, the sealing means 120, is moved upward and downward relative to the container 2 to make the sealing means 120 intimately contacted with and spaced from the inner end of the flange section 12 of the container 2. However, the support means 116 supporting the container 2 may be raised and lowered, whereby the sealing means 120 can be intimately contacted with and spaced from the inner end of the flange section 12 of the container 2. It is essential only that the sealing means 120 be moved in a reciprocating manner relative to the container.

Figure 7:
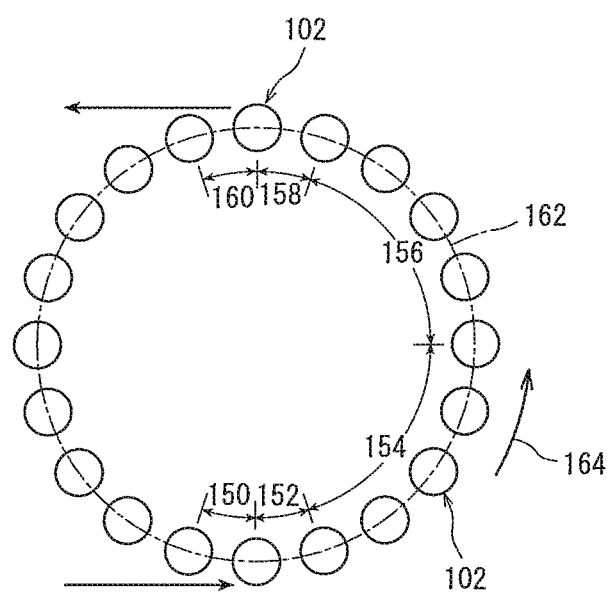
FIG. 7 is a schematic view showing a state in which the container flange section cleaning devices are arranged along a circular transport path in the container sealing system according to the present invention.

FIG. 7 is a view showing a state in which the flange section cleaning device 102 is disposed along a circular transport path 162 including a container carry-in region 150, a sealing region 152, a cleaning region 154, a solution removal region 156, a separation region 158, and a container carry-out region 160, while being rotated about the center of the circular transport path 162. In this state, a plurality of (20 in the drawing) the flange section cleaning devices 102 are arranged with equal spacing, and continuously rotated about the center of the circular transport path 162 in a direction indicated by an arrow 164 along the circular transport path 162. In the container carry-in region 150, the container 2 filled with the contents is carried into and placed on the support means 116 of the cleaning device 102 by a suitable carry-in means (not shown). Then, in the sealing region 152, the sealing means 120 lowers and intimately contacts the inner peripheral end of the flange section 12 of the container 2 to seal the container 2 filled with the contents. After sealing, in the cleaning region 154, the cleaning solution supply source 140 is actuated, whereby the cleaning solution is jetted at the upper surface of the flange section 12 of the container 2 for cleaning of the flange section. Then, in the solution removal region 156 after cleaning, the gas supply source 142 is actuated, whereby the gas is jetted at the upper surface of the flange section 12 of the container 2 to remove the cleaning solution. After this solution removal, in the separation region 158, the sealing means 120 is raised and spaced from the inner peripheral end of the flange section 12 of the container 2. Finally, in the container carry-out region 160, the container 2 having the upper surface of the flange section 12 cleaned and removed of the solution is carried outward from the site on the support means 116 by a suitable carry-out means (not shown).

The invention claimed is:

1. A container sealing apparatus, comprising:

a rotating spindle;

rotating turret means disposed around the rotating spindle and having a plurality of pockets along a circular transport path;

a plurality of container support means which are arranged below the rotating turret means in correspondence with the plurality of pockets, and which can rotate about the rotating spindle and rotate on axes of the container support means, each of the plurality of container support means comprising at least one body;

a plurality of lid pressing means which are arranged above the rotating turret means in correspondence with the container support means, which can rotate about the rotating spindle and rotate on axes of the lid pressing means, and which can ascend and descend relative to the container support means, each of the plurality of lid pressing means comprising at least one body; and a plurality of laser irradiation means capable of rotating about the rotating spindle and adapted to throw laser light toward a container, against which a lid has been pressed by the container support means and the lid pressing means, thereby heat welding the lid to the container, wherein lower table means located below the rotating turret means is disposed on the rotating spindle and the laser irradiation means are arranged on the lower table means, the plurality of laser irradiation means are provided in correspondence with the container support means, the container includes a flange section extending radially outward, the lid is configured to be placed on the flange section of the container, the plurality of laser irradiation means are provided in correspondence with the plurality of pockets of the turret means, and the laser irradiation means is configured to throw the laser light in an upward direction to the flange section of the container.

2. The container sealing apparatus according to claim 1, wherein upper table means located above the rotating turret means is disposed on the spindle, and the lid pressing means are arranged in the upper table means.

3. The container sealing apparatus according to claim 1, wherein the container support means are arranged to be movable upward and downward, and ascent/descent means, comprising at least one body, is annexed for raising and lowering each of the container support means.

4. The container sealing apparatus according to claim 1, wherein the laser irradiation means are direct diode lasers.

5. A container sealing system including the container sealing apparatus according to claim 1, and a container flange section cleaning device for cleaning a flange section of the container, which is to be sealed, prior to sealing, wherein the container flange section cleaning device comprises:

support means, comprising at least one body, for supporting the container;

sealing means, comprising at least one body, intimately contacting and separating from an inner peripheral end of the flange section, and reciprocating relative to the container; and cleaning/solution removal means, disposed above the sealing means, for bringing the sealing means into intimate contact with the inner peripheral end, jetting a cleaning solution at an upper surface of the flange section, and jetting a gas at the upper surface of the flange section after jetting the cleaning solution.

6. The container sealing system according to claim 5, wherein the cleaning/solution removal means has a jet orifice and a flow path leading to the jet orifice, and is equipped with a cleaning solution supply source for supplying the cleaning solution to the jet orifice via the flow path, and a gas supply source for supplying the gas to the jet orifice via the flow path.

7. The container sealing system according to claim 6, wherein the jet orifice is many small holes provided at suitable intervals in a circumferential direction.

8. The container sealing system according to claim 5, wherein an outer peripheral surface of the sealing means is in an inverted truncated conical shape.

9. The container sealing system according to claim 5, wherein a site of the sealing means making intimate contact with the inner peripheral end of the flange section of the container is a rubbery elastic body.

10. The container sealing system according to claim 5, wherein the container flange section cleaning device is disposed along a circular transport path sequentially including a container carry-in region, a sealing region where the sealing means is brought into intimate contact with the flange section of the container, a cleaning region for the flange section, a solution removal region for the flange section, a separation region where the sealing means is separated from the flange section, and a container carry-out region, with the container flange section cleaning device being rotated about a center of the circular transport path.

11. The container sealing apparatus according to claim 1, wherein support bases are fixed on the lower table means, each support base has an inclined support surface, and each laser irradiation means is positioned so as to be adjustable along the support surface.

12. The container sealing apparatus according to claim 1, wherein the lower table means is provided on the spindle separately from the container support means.

* * * * *